United States Patent

[11] 3,631,732

[72] Inventor Edward Kleban
337 South Maple Ave., Basking Ridge, N.J. 07920
[21] Appl. No. 17,255
[22] Filed Mar. 6, 1970
[45] Patented Jan. 4, 1972

[54] ADJUSTABLE BELT ASSEMBLY
7 Claims, 9 Drawing Figs.

[52] U.S. Cl. ................................................. 74/231 J, 74/258
[51] Int. Cl. ................................................. F16g 1/00, F16g 13/02
[50] Field of Search .................................. 74/231 J, 234, 258, 242.8; 57/158

[56] References Cited
UNITED STATES PATENTS
2,835,135  5/1958  Quick .......................... 74/242.8 X
1,570,801  1/1926  Vollrath ....................... 74/231 J X
3,501,971  3/1970  Peterson ...................... 74/231 J FOREIGN PATENTS
1,022,085  3/1966  Great Britain ............. 74/258
657,652    9/1951  Great Britain ............. 74/258

*Primary Examiner*—Leonard H. Gerin
*Attorney*—Bernard J. Murphy

ABSTRACT: An adjustable belt assembly, usable with machinery for communicating torque between a plurality of movable members, having mutually, threadedly engageable coupling elements at terminal ends of a disconnected belt. In one embodiment, the coupling elements are wholly confined within the cross-sectional area of the belt material; in another, portions of the coupling elements extend from the belt surface and receive a bolt for closing the ends of the belt.

PATENTED JAN 4 1972  3,631,732

INVENTOR
EDWARD KLEBAN
BY
Bernard J. Murphy
AGENT

ADJUSTABLE BELT ASSEMBLY

This invention pertains to belt assemblies usable with machinery for communicating torque between a plurality of movable members, and in particular to a belt assembly having means for effecting an alteration of the given length thereof.

In the prior art, it is known to alter the effective length of a belt assembly by disposing a rotatable member against the belt with more or less constraint. The more the member is constrained against the belt, the more the belt is caused to depart from its normal course of movement; thus, the effective length of the belt is foreshortened. However, when the belt is worn and requires replacement, it is customarily necessary to dismantle or at least displace one or more of the movable members between which the belt communicates torque.

Considering, for purposes of illustration, the procedures necessary in replacement of an automobile fan belt will highlight the difficulties obtaining in the art with known belt assemblies. The automobile fan belt defines a closed, inseparable loop. To effect its installation, one must loosen mounting bolts which secure the automobile's alternator or generator. The loosely mounted component must be displaced in a direction which will facilitate the emplacement of the fan belt about its pulley. Then, the component—alternator or generator—must be returned to its proper orientation and fastened in place. However, as the replacement fan belt must be emplaced with a prescribed amount of readily effected displacement, relative to its axis of motion, it is necessary to adjust and readjust the mounting of the given alternator or generator. This procedure is time consuming and difficult, and requires the deployment of a number of handtools, to wit: a wrench for loosening mounting bolts, and a type of pry bar for making the several trial-and-error adjustments and readjustments of the component mounting.

Belt material of even the finest quality will be subject to stretch and/or contraction, after a period of use, and depending upon the environmental temperatures in which it is given to perform. Accordingly, to insure the optimum effectiveness of the belt assembly, it is necessary to adjust the effective length of the belt from time to time. The belt of the closed, inseparable loop type presents no facile means for altering its effective length. Thus, the same kinds of complicated procedures, as just outlined with respect to the replacement of the automobile fan belt, must be laboriously pursued.

It is an object of this invention, therefore, to teach an adjustable belt assembly the use of which obviates the limitations found in belt assemblies known in the prior art such as those just noted.

It is another object of this invention to teach an adjustable belt assembly comprising a belt having a plurality of terminal ends with means for selectively coupling said ends in greater and lesser proximity to each other to effect alteration of the given length of the belt.

It is another object of this invention to teach an adjustable belt assembly of the type noted which further comprises means for wholly decoupling said ends from each other.

A feature of this invention, in one embodiment thereof, comprises the disposition of coupling means, which are mutually, threadedly engageable, in terminal ends of a belt, the coupling means being wholly confined within the cross-sectional area of the belt.

Another feature of this invention, in another embodiment thereof, comprises the disposition of coupling means, which are mutually, threadedly engageable, in terminal ends of a belt, the coupling means extending from the longitudinal axis of the belt to insure a closure of the ends of the belt upon one another.

Further objects and features of this invention will become more apparent by reference to the following description taken in conjunction with the accompanying figures, in which.

Figure 1:
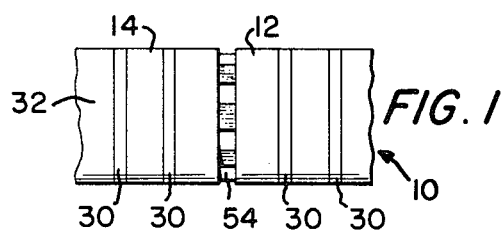
FIG. 1 is a top view of a fragment of an adjustable belt assembly, according to one embodiment of the invention.

In FIG. 1 is shown a belt assembly 10, according to my invention, having terminal ends 12 and 14 which are adjustably coupled together by means shown more fully in FIGS. 2 through 5.

Figure 8:
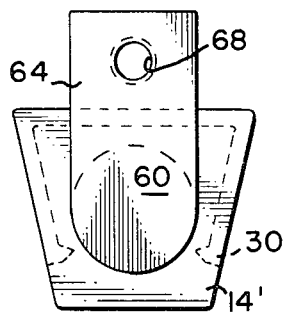
FIG. 8 is an end view of the belt end of the FIG. 6 illustration, taken from sectional 8—8 of FIG. 6.
Figure 9:
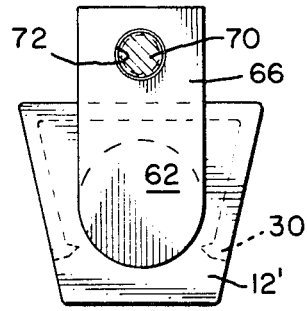
FIG. 9 is an end view of the belt end of the FIG. 7 illustration, taken through the coupling bolt along section 9—9 of FIG. 7.
Figure 6:
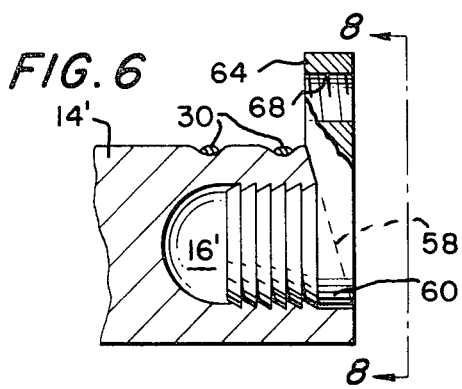
FIGS. 6 and 7 are axial cross-sectional view of another embodiment of the invention, comprising belt-end inserts having portions extending from a surface of the belt.
Figure 7:
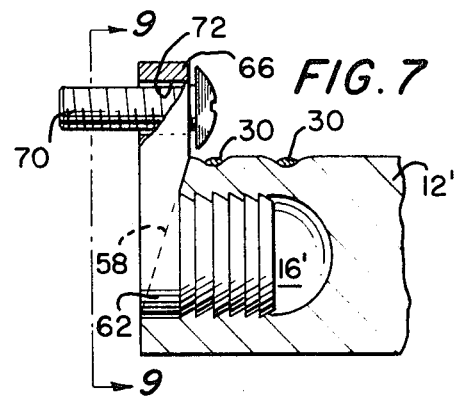
Figure 4:
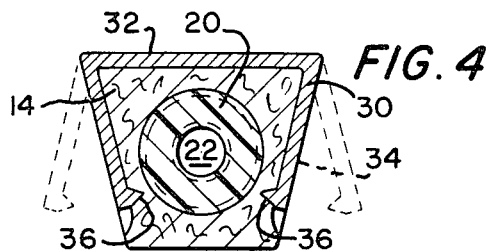
FIG. 4 is a transverse cross-sectional view of the belt end of FIG. 2 taken along section 4—4 thereof.
Figure 2:
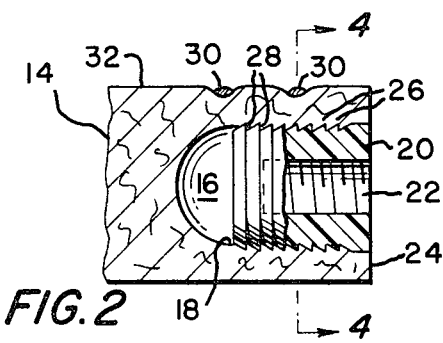
FIG. 2 is an enlarged, axial cross-sectional view of one of the belt ends of the embodiment of FIG. 1.

As evidenced in FIGS. 2 and 4, terminal end 14 has a relieved area 16 of cylindrical or circular form which has a major diameter 18 of a given dimension. An insert 20 of circular cross section of slightly greater diameter is disposed in area 16. Insert 20 has a tapped borehole 22 formed therein which opens on the face 24 of the terminal end. Further, the insert 20 has alternating, circumferential ribs 26 and grooves 28 formed in the surface thereof for restraining the insert in the area 16. A pair of stiff, metal clasps 30 are pressed into a top surface 32 of the belt end 14 and have been clenched into the sides 34 to assist in securing the insert 20 in area 16. The clasps 30 have pointed tangs 36 which embed in the belt material to resist axial displacement, at the projecting ends thereof. FIG. 4, in dashed outline, shows the disposition of the clasps 30 after being pressed into surface 30 and prior to their being clenched into sides 34.

My invention contemplates the pre-preparation of belts of prescribed lengths, with inserts in separated ends thereof ready for coupling together, and the clasping of insert 20—as explained in connection with FIGS. 2 and 4—should be understood to pertain to the inserts of FIGS. 3 and 5, and 6–9.

Figure 5:
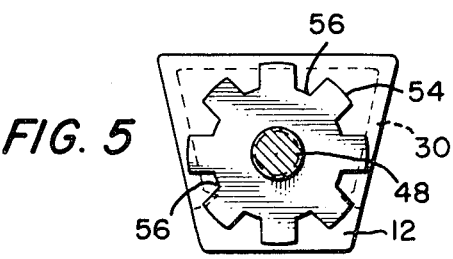
FIG. 5 is an end view of the belt end of FIG. 3 taken across the coupling bolt along section 5—5 of FIG. 3.
Figure 3:
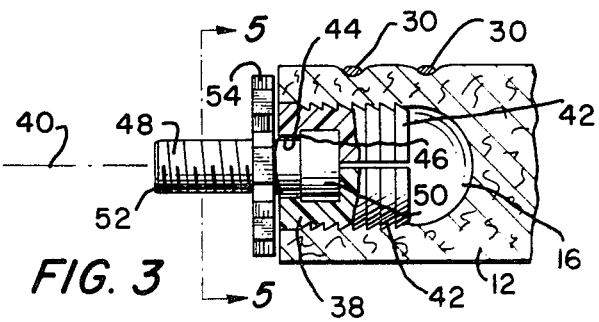
FIG. 3 is an enlarged, axial cross-sectional view of the other of the belt ends of the FIG. 1 embodiment in which, however, the coupling bolt is not cross sectioned.

FIGS. 3 and 5 illustrate an insert 38 which comprises a housing split along the longitudinal axis 40 of the belt. Housing segments 42 define a cavity 44 therewithin which has a shoulder 46 extending radially inwardly. A headed bolt 48 is rotatively captive in the cavity, the head 50 thereof being retained by the shoulder 46, and the threaded shank 52 extends from end 12 for threaded engagement with the tapped borehole 22 (FIG. 2 and 4).

Bolt 48, according to my invention, has an adjustment wheel 54 for facilitating rotation of the bolt. One initial coupling of ends 12 and 14, the wheel 54 can be turned by use of the fingers. As the ends close upon one another, the wheel can be facilely turned farther by use of a small spanner wrench or by disposing the edge of a screwdriver blade forcefully into succeeding recesses 56 of the wheel surface.

In this embodiment of the invention, i.e., the embodiment comprises by FIGS. 1 through 5, the adjustable coupling of the ends 14 and 12 is arranged for wholly within the area defined by a transverse cross section of the belt material. In some less critical applications, it will not be necessary that the coupling means be wholly confined within such an area, while it may be more desirable to have the terminal ends of the belt fully close upon one another. To meet such applications, I teach an alternate embodiment of the invention, as shown in FIGS. 6 through 9.

Index numbers presented in FIGS. 6 through 9 which are the same as, or similar to, index numbers in FIGS. 1 through 5 denote elements which are the same as or similar to such indexed parts in FIGS. 1 through 5. Significant differences in elements, as they subsist, are noted in the ensuing text.

The alternate embodiment of my invention comprises the provisioning of belt ends 12' and 14' from which portions thereof have been removed on angular cuts 58. The cuts accommodate for the emplacement of inserts 60 and 62 in the respective areas 16', with the disposal of perpendicular portions 64 and 66 for projection above surfaces 32 (of each end).

Portion 64 has a tapped borehole 68 formed therein for receiving the bolt 70 carried in an unthreaded borehole 62 formed in portion 66. Where an optimum length of belt presupposes an engagement of ends 12' and 14' in interfacing engagement, this alternate embodiment will accommodate for this.

While I have described my invention in connection with specific embodiments thereof, it is to be clearly understood that this is done only by way of example and not as a limitation to the scope of my invention as set forth in the objects thereof and in the appended claims. Other embodiments will occur to those skilled in the art to which my invention pertains, the same taking teaching from my invention. In other embodiments, for instance, all within the spirit of my teaching, it may be found advantageous to assist the retention of the inserts 20, 38, 60 and 62, by setting the same in the relieved areas 16 (and 16') with an epoxy. Also, it may prove more simple of assembly if clasps 30 are dispensed with, and pins are inserted through the respective inserts and the belt material. Further, I teach inserts formed of plastic; I contemplate a plastic which is semirigid in nature which can withstand limited bending stresses. My plastic inserts 20 and portions 64 can well have heli-coil inserts for the respective tapped boreholes to insure against disruption of the plastic threads. Of course, where the belt assembly will be used in an application in which large radius turns are involved, the inserts might be formed of metal. Very simply, then, not all practical structuring of belt assemblies possible from the teachings of my invention has been exhausted by the embodiments presented in this specification.

I claim:

1. An adjustable belt assembly, usable with machinery for communicating torque between a plurality of movable members, comprising:
   a belt having a plurality of terminal ends;
   at least one of said ends having means for engaging coupling means; and
   at least another of said ends having coupling means for the mating thereof with said engaging means; wherein
   both said means comprise means for selectively coupling said ends in greater and lesser proximity to each other to effect alteration of a given length of said belt; wherein
   said belt has a longitudinal axis;
   said ends have terminal surface and relieved areas formed therewithin along said axis, said areas opening on said surfaces; and
   said coupling means, said engaging means, are disposed in said relieved areas of said one and said another ends, respectively;
   said relieved areas define circular bores each having a given major cross-sectional diameter; and
   said coupling and engaging means each comprise inserts having a major cross-sectional diameter slightly greater than said given diameter; and wherein
   said inserts have circumferential ribs and grooves formed in the external surfaces thereof to effect a restrained engagement of said external surfaces with surface of said bores.

2. An adjustable belt assembly, according to claim 1, wherein:
   said both means further comprise means for wholly decoupling said ends from each other.

3. An adjustable belt assembly, according to claim 1, further including:
   clasp means for enhancing a retention of said engaging and said coupling means in said relieved areas.

4. An adjustable belt assembly, according to claim 1, wherein:
   said belt has a given cross-sectional area; and
   said engaging and coupling means are wholly confined within said area.

5. An adjustable belt assembly, according to claim 1, wherein:
   one of said inserts comprises a split housing;
   said housing defining a shouldered cavity therewithin which is open at one end thereof on said terminal surface; and including
   a headed bolt rotatably secured in said cavity and extending outwardly therefrom in projection from said terminal surface;
   said bolt having a radial wheel with a discontinuous circumferential surface for facilitating rotation of said bolt to effect a threaded engagement of said bolt with another of said inserts and relative movement of said one insert with respect to said another insert along said axis.

7. An adjustable belt assembly, according to claim 1, wherein:
   said inserts each have portions thereof which extend perpendicularly from said axis, and project beyond a given surface of said belt;
   one of said inserts having a threaded borehole formed in the extending portion thereof; and
   another of said inserts having an unthreaded borehole formed in the extending portion thereof;
   said unthreaded borehole carrying a bolt in penetration thereof for threaded engagement of said bolt with said threaded borehole.

6. An adjustable belt assembly, according to claim 5, wherein:
   said inserts are formed of plastic.

* * * * *